US008899344B2

(12) United States Patent
Obando

(10) Patent No.: US 8,899,344 B2
(45) Date of Patent: Dec. 2, 2014

(54) GARDEN TOOL

(76) Inventor: Marcelo Obando, Honolulu, HI (US)

( * ) Notice: Subject to any disclaimer, the term of this patent is extended or adjusted under 35 U.S.C. 154(b) by 320 days.

(21) Appl. No.: 13/097,360

(22) Filed: Apr. 29, 2011

(65) Prior Publication Data

US 2012/0272458 A1 Nov. 1, 2012

(51) Int. Cl.

| | |
|---|---|
| ***A01B 1/00*** | (2006.01) |
| ***B25G 3/30*** | (2006.01) |
| ***B25G 1/04*** | (2006.01) |
| ***A01B 1/22*** | (2006.01) |

(52) U.S. Cl.

CPC . *A01B 1/227* (2013.01); *B25G 3/30* (2013.01); *B25G 1/04* (2013.01)

USPC .......................................................... 172/378

(58) Field of Classification Search

CPC ............ A01B 1/14; A01B 1/20; A01B 1/227; A01B 1/022; A01D 7/08; A01D 7/10; B25F 1/02; B25G 1/01; B25G 1/04; B25G 3/00

USPC ............................ 7/114, 115, 116, 143, 167; 56/400.01–400.06; 294/49, 51, 57–60; 172/371–378

See application file for complete search history.

(56) References Cited

U.S. PATENT DOCUMENTS

| | | | | |
|---|---|---|---|---|
| 2,280,778 | A * | 4/1942 | Andersen | 172/371 |
| 4,790,585 | A * | 12/1988 | Vernon et al. | 294/51 |
| 4,892,156 | A | 1/1990 | Willis | |
| 5,004,053 | A * | 4/1991 | Martell | 172/375 |
| 5,297,306 | A * | 3/1994 | Shandel | 7/114 |
| 5,377,374 | A | 1/1995 | Green | |
| 5,452,769 | A * | 9/1995 | Markert | 172/380 |
| 5,581,889 | A | 12/1996 | Reuter | |
| 5,609,215 | A * | 3/1997 | Rios et al. | 172/373 |
| 5,743,580 | A * | 4/1998 | Evans | 294/51 |
| 5,765,648 | A | 6/1998 | Sheehan et al. | |
| 5,799,996 | A * | 9/1998 | Fredrickson | 294/51 |
| 5,816,633 | A * | 10/1998 | Odom | 294/51 |
| 6,082,795 | A | 7/2000 | Fornelli | |
| 6,311,783 | B1 * | 11/2001 | Harpell | 172/380 |
| 6,694,717 | B1 * | 2/2004 | Dedrick | 56/400.04 |
| 2002/0020537 | A1 | 2/2002 | Shonfeld et al. | |
| 2005/0133230 | A1 | 6/2005 | Sheehan et al. | |
| 2007/0284123 | A1 | 12/2007 | Lee | |
| 2010/0018730 | A1 | 1/2010 | Schultz | |
| 2010/0319943 | A1 | 12/2010 | Holdredge | |

FOREIGN PATENT DOCUMENTS

| | | |
|---|---|---|
| JP | 11-220922 A | 8/1999 |

* cited by examiner

*Primary Examiner* — Robert Pezzuto

(74) *Attorney, Agent, or Firm* — Greenberg Traurig

(57) ABSTRACT

A garden tool includes multiple of the following features: fishtail weeder/nail remover, trowel, nail remover, machete, saw, serrated blade, small-toothed saw, ergonomic handle, safety stop and attachment means for an elongated handle or cane. A rake attachment may also be attached to the elongated handle. The all-in-one tool: (i) saves space and money; (ii) is lightweight; (iii) minimizes the number of necessary tools; and (iv) is adjustable to accommodate user limitations (i.e., disabilities).

20 Claims, 3 Drawing Sheets

GARDEN TOOL

FIELD OF THE INVENTION

The embodiments of the present invention relate to an all-in-one type garden tool.

BACKGROUND

Tending to gardens normally requires a series of different tools designed to accomplish unique objectives (e.g., prune, dig, weed, etc.). The use of such a large number of tools is cumbersome and requires appropriate storage. Even with appropriate storage, often times tools are misplaced and not available when needed.

Thus, there is a need for an all-in-one type garden tool comprising multiple tools and features allowing the single garden tool to accomplish the objectives of the multiple individual tools now being used. Advantageously, the all-in-one tool should be safe to use and adaptable to gardening conditions.

SUMMARY

Accordingly, the embodiments of the present invention comprise a garden tool comprising multiple of the following features: fishtail weeder/nail remover, trowel, nail remover, machete, saw, blade, small-toothed saw, ergonomic handle, safety stop and attachment means for an elongated handle or cane. The all-in-one tool: (i) saves space and money; (ii) is lightweight; (iii) minimizes the number of necessary tools; and (iv) is adjustable to accommodate user limitations (i.e., disabilities).

In one embodiment, the tool comprises a generally U-shaped trowel with a leading edge weeder/nail remover, side edge saw, side edge machete, rear edge blade, rear edge micro-serrated saw, ergonomic handle, safety stop between said trowel and handle and attachment means for attachment of a elongated handle which converts the garden tool into a shovel or cane. In one embodiment, a rake attachment is configured for attachment to the elongated handle.

Other variations, embodiments and features of the present invention will become evident from the following detailed description, drawings and claims.

DETAILED DESCRIPTION

Figure 1:
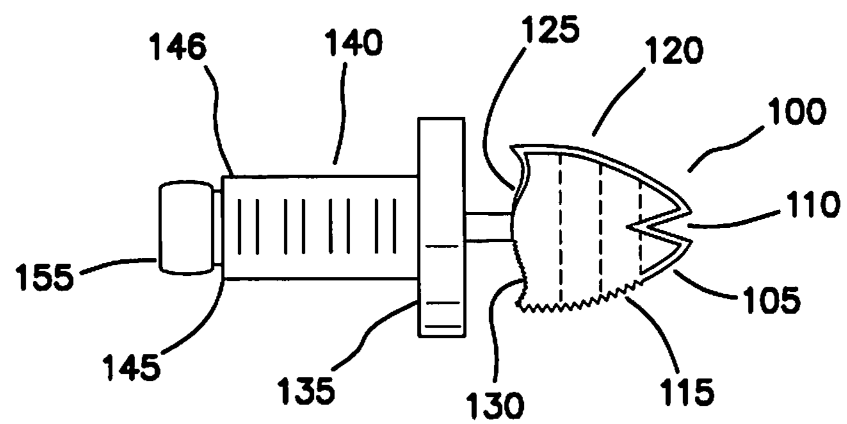
FIG. 1 illustrates an upper view of an all-in-one type tool according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The embodiments of the present invention relate to an all-in-one type garden tool comprising multiple features in a single tool. While specific tool configurations are illustrated and described herein, other tool configurations are contemplated and within the spirit and scope of the present invention. The tool and related attachable items illustrated and described herein may be fabricated of any suitable materials, including metals, alloys, composites, plastics and the like. The tool and its component parts may be fabricated using known techniques such as molding, machining, milling and the like.

FIG. 1 shows an all-in-one type garden tool 100 according to the embodiments of the present invention. The garden tool 100 comprises a trowel 105, weeder and nail remover 110, side edge saw 115, side edge machete 120, rear edge blade 125, rear edge micro-serrated saw 130, safety stop 135 and handle 140. One end 145 of the handle 140 is configured for receipt of an elongated handle 150 (see, FIGS. 2*a*, 2*b* and 3). A cap 155 protects an attachment means 146 configured for receipt of the elongated handle 150. The attachment means 146 may comprise a threaded member (e.g., collar) configured to receive a threaded end of the elongated handle 150, or a channel extending into the tool handle 140 which is configured to receive one end of the elongated handle 150 in a frictional relationship, or any other suitable means for attaching the elongated handle 150 to the tool handle 140.

The weeder and nail remover 110 is positioned on the leading edge of the trowel 105 and comprises a cut-out which may or may not be sharpened along its edges. The tool handle 140 is ergonomically designed to accommodate a user's hand providing a comfortable experience. In one embodiment, the tool handle 140 includes four grooves forming a hand grip configured for comfortably accommodating a user's finger.

The safety stop 135, as shown, is in the form of a bar. However, those skilled in the art will recognize that other forms (e.g., circular collar, rectangular plate) may be integrated between the trowel 105 and tool handle 140 to prevent a user's hand from inadvertently slipping off the tool handle 140 during use and into the rear edge blade 125 and/or rear edge micro-serrated saw 130. The safety stop 135 therefore prevents injury to the user.

Figure 2A:
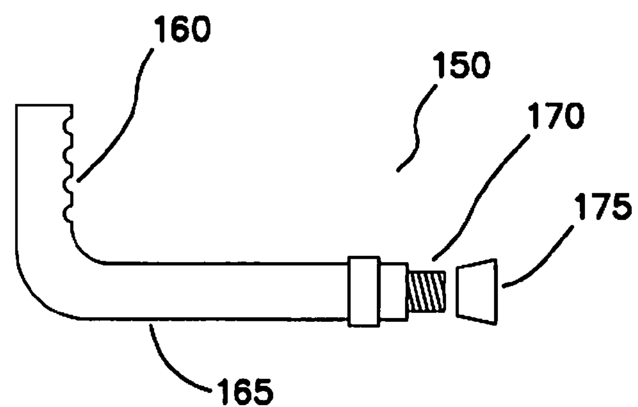
FIGS. 2*a* and 2*b* illustrate an elongated handle/cane according to the embodiments of the present invention.
Figure 2B:
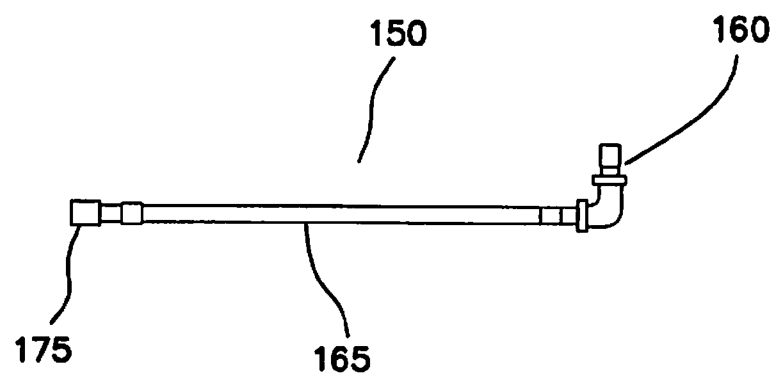

FIGS. 2*a* and 2*b* shows the elongated handle 150 comprising a grip 160, telescoping shaft 165 and attachment device 170 configured to mate with attachment means 146 on the tool handle 140. A cap 175 is configured to protect the attachment device 170. The telescoping shaft 165 may use an arrangement comprising a pin and multiple openings to facilitate the lengthening and shortening of the telescoping shaft 165. Other means including a tightening and loosening collar may be used to facilitate lengthening and shortening of the telescoping shaft 165. When attached, the elongated handle 150 serves multiple purposes. First, the elongated handle 150 allows a user to operate the garden tool 100 in a manner synonymous with a conventional shovel. Second, the grip 160 and elongated handle 150 allows the garden tool 100 to be used in a manner synonymous with a cane such that an elderly or disabled user may utilize the garden tool 100 to move from one garden location to another garden location or more remote location (e.g., house). The curved nature of the grip 160 relative the telescoping shaft 165 (i.e., generally 90 degrees as shown) allows the elongated handle 150 and garden tool 100 to act as a cane.

Figure 3:
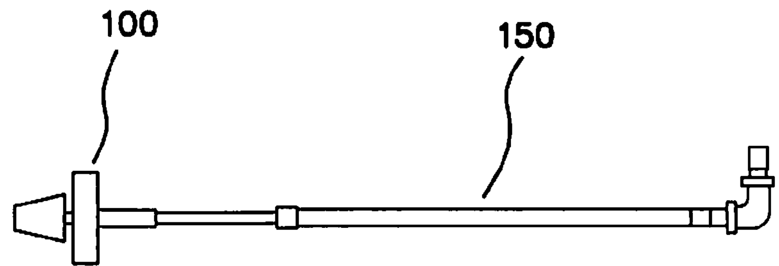
FIG. 3 illustrates the elongated handle/cane attached to the tool according to the embodiments of the present invention.

FIG. 3 shows the elongated handle 150 attached to the garden tool 100. As set forth herein, the attachment means 146 may comprise any suitable means configured to attach the elongated handle 150 to the tool handle 140.

Figure 4:
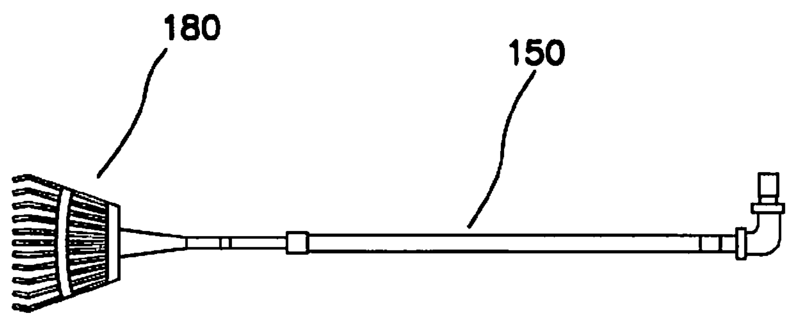
FIG. 4 illustrates an elongated handle/cane with a rake attached according to the embodiments of the present invention.

FIG. 4 shows a rake attachment 180 attached to the elongated handle 150 to form a conventional rake tool.

Figure 5:
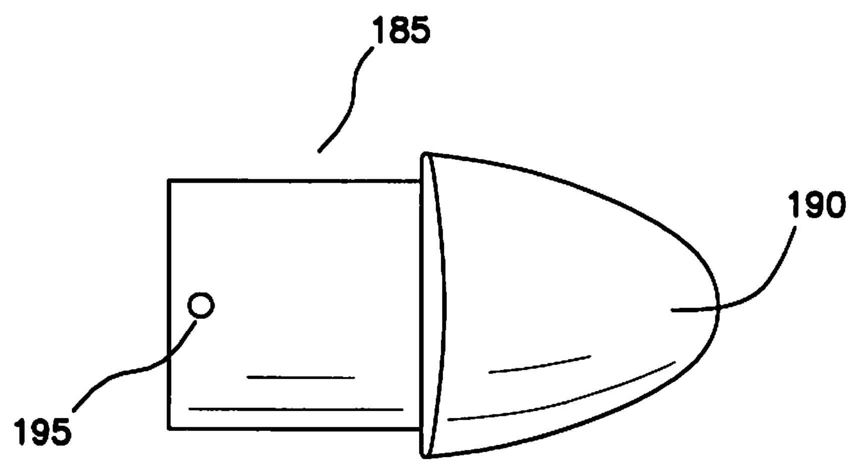
FIG. 5 illustrates an exemplary garden tool case according to the embodiments of the present invention.

FIG. 5 shows an exemplary case 185 for containing the garden tool 100 when not in use. The case 185 includes a trowel sleeve 190 configured to receive the trowel 105 thereby concealing the weeder and nail remover 110, side edge saw 115, side edge machete 120, rear edge blade 125 and rear edge micro-serrated saw 130. A snap, button 195, opening or similar means allows the case 185 to be attached to a tool belt.

Although the invention has been described in detail with reference to several embodiments, additional variations and modifications exist within the scope and spirit of the invention as described and defined in the following claims.

I claim:

1. A garden tool comprising:

a trowel, said trowel having integral along edges thereof the following:

(i) a V-shaped weeder on a front edge of said trowel;

(ii) a machete along a first side edge extending from said weeder to a rear surface of said trowel;

(iii) a first serrated saw along a second side edge extending from said weeder to a rear surface of said trowel;

(iv) a blade on a first portion of a rear edge of said trowel; and (v) a second serrated saw on a second portion of said rear edge of said trowel, said first and second portions of said rear edge separated by said handle, said second serrated saw having a greater concentration of teeth than said first serrated saw;

a tool handle dimensioned for accommodating a user's hand, said trowel joined directly to said tool handle; and a safety stop in the form of a structural member extending outward in multiple directions from said handle, said safety stop positioned between and directly proximate said trowel and said tool handle such that a user's hand is directly proximate said safety stop when gripping said tool handle, said safety stop configured to prevent a user's hand from sliding off said handle towards said rear edge of said trowel.

2. The garden tool of claim 1 further comprising attachment means at one end of said tool handle, said attachment means configured for attachment to an elongated handle.

3. The garden tool of claim 2 wherein said elongated handle includes a grip and shaft.

4. The garden tool of claim 3 wherein said grip forms a generally 90 degree angle with said shaft.

5. The garden tool of claim 1 wherein said safety stop is configured as a bar.

6. The garden tool of claim 1 wherein said safety stop is configured as a rectangular plate.

7. The garden tool of claim 1 wherein said safety stop is configured as a circular collar.

8. A garden tool comprising:

a trowel having a V-shaped cut-out weeder at a leading edge thereof, said trowel having two side edges and two rear edges;

a machete along a first side edge of said trowel, said first edge extending from said weeder to a rear surface of said trowel;

a first serrated saw along a second side edge of said trowel, said second side edge extending from said weeder to a rear surface of said trowel;

a second serrated saw along a first rear edge of said trowel, said second serrated saw having a greater concentration of teeth than said first serrated saw;

a blade along a second rear edge of said trowel, said first and second edges separated by said handle;

a tool handle dimensioned for accommodating a user's hand, said trowel joined directly to said tool handle; and a safety stop in the form of a structural member extending outward in multiple directions from said handle, said safety stop positioned between and directly proximate said trowel and said tool handle such that a user's hand is directly proximate said safety stop when gripping said tool handle, said safety stop configured to prevent a user's hand from sliding off said handle towards said rear edge of said trowel.

9. The garden tool of claim 8 further comprising attachment means at one end of said tool handle, said attachment means configured for attachment to an elongated handle.

10. The garden tool of claim 9 wherein said elongated handle includes a grip and shaft.

11. The garden tool of claim 10 wherein said grip forms a generally 90 degree angle with said shaft.

12. The garden tool of claim 8 wherein said safety stop is configured as a bar.

13. The garden tool of claim 8 wherein said safety stop is configured as a rectangular plate.

14. The garden tool of claim 8 wherein said safety stop is configured as a circular collar.

15. A garden tool comprising:

a trowel, said trowel having integral along edges thereof the following:

(i) a V-shaped weeder on a front edge of said trowel;

(ii) a machete along a first side edge extending from said weeder to a rear surface of said trowel;

(iii) a first saw along a second side edge extending from said weeder to a rear surface of said trowel;

(iv) a blade on a first portion of a rear edge of said trowel; and (v) a second serrated saw on a second portion of said rear edge of said trowel, said first and second portions of said rear edge separated by said handle, said second serrated saw having a greater concentration of teeth than said first serrated saw;

a tool handle dimensioned for accommodating a user's hand, said trowel joined directly to said tool handle;

a safety stop in the form of a structural member extending outward in multiple directions from said handle, said safety stop positioned between and directly proximate said trowel and said tool handle such that a user's hand is directly proximate said safety stop when gripping said tool handle, said safety stop configured to prevent a user's hand from sliding off said handle towards said rear edge of said trowel; and attachment means on one end of said tool handle, said attachment means configured to receive an elongated handle.

16. The garden tool of claim 15 wherein said elongated handle includes a grip and shaft.

17. The garden tool of claim 16 wherein said grip forms a generally 90 degree angle with said shaft.

18. The garden tool of claim 15 wherein said safety stop is configured as a bar.

19. The garden tool of claim 15 wherein said safety stop is configured as a rectangular plate.

20. The garden tool of claim 15 wherein said safety stop is configured as a circular collar.

* * * * *